United States Patent

Cook et al.

[15] 3,642,032
[45] Feb. 15, 1972

[54] INTERNAL PIPE CLAMP APPLYING APPARATUS AND METHOD

[72] Inventors: Robert W. Cook, Decatur, Ind.; Edmond J. Bissaillon, Atlanta, Ga.; Robert P. Dickinson, St. Louis, Mo.

[73] Assignee: Fischer-Cook, Inc., Decatur, Ind.

[22] Filed: Apr. 16, 1970

[21] Appl. No.: 29,164

[52] U.S. Cl. ............................................................. 138/97
[51] Int. Cl. ......................................................... F16l 55/18
[58] Field of Search ..................................................... 138/97

[56] References Cited

UNITED STATES PATENTS

| | | | |
|---|---|---|---|
| 2,894,539 | 7/1959 | Cook et al. | 138/97 |
| 3,149,646 | 9/1964 | Xenis | 138/97 |
| 1,180,714 | 4/1916 | Hall | 138/97 |
| 2,517,626 | 8/1950 | Berg | 138/97 |

*Primary Examiner*—Herbert F. Ross
*Attorney*—Woodard, Weikart, Emhardt & Naughton

[57] ABSTRACT

The method of the invention utilizes opening of a gas pipeline and introducing into its interior a mobile assembly which carries an array of separable, discrete leak sealing rings, moving the assembly along the interior of the conduit to the site of a leak, then expanding and disengaging one of the rings into leak sealing position, then advancing the assembly to the next leak, repeating the operation until all of the leak sealing rings in the array carried by the assembly have been thus utilized. The assembly includes air-operated positioning elements for guide wheels on which the apparatus travels, and a power operated element for advancing the sealing rings, one by one, into operative relation with a ring expander, also forming a part of the travelling assembly.

4 Claims, 10 Drawing Figures

INVENTORS
ROBERT W. COOK
EDMOND J. BISSAILLON
ROBERT P. DICKINSON
BY
Woodard, Weikart, Emhardt & Naughton
ATTORNEYS

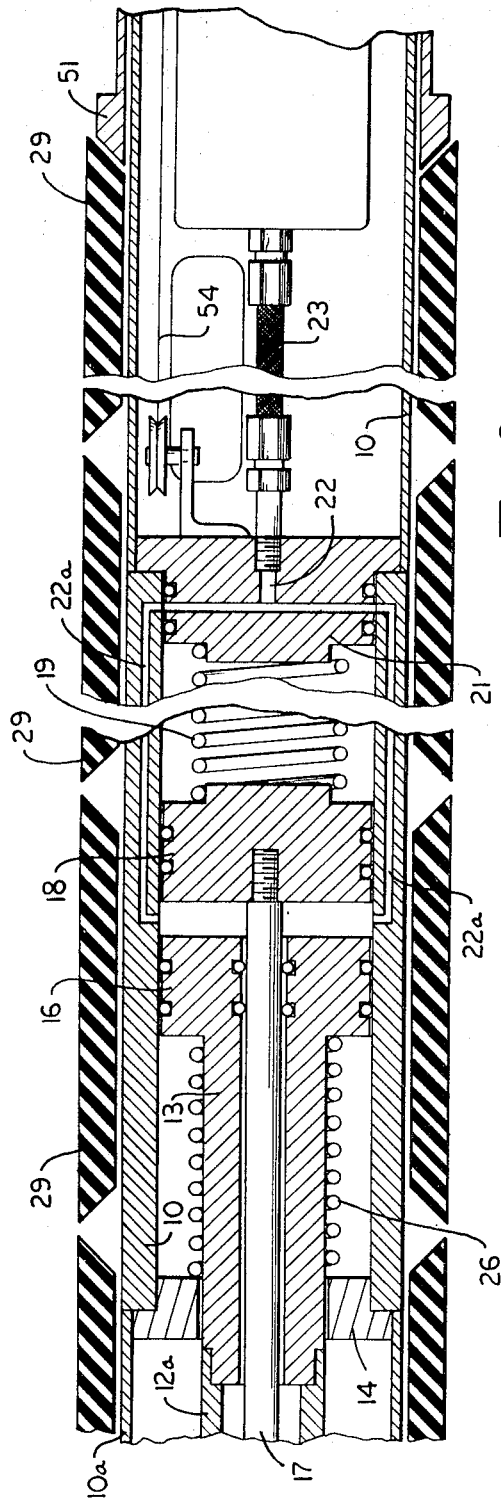
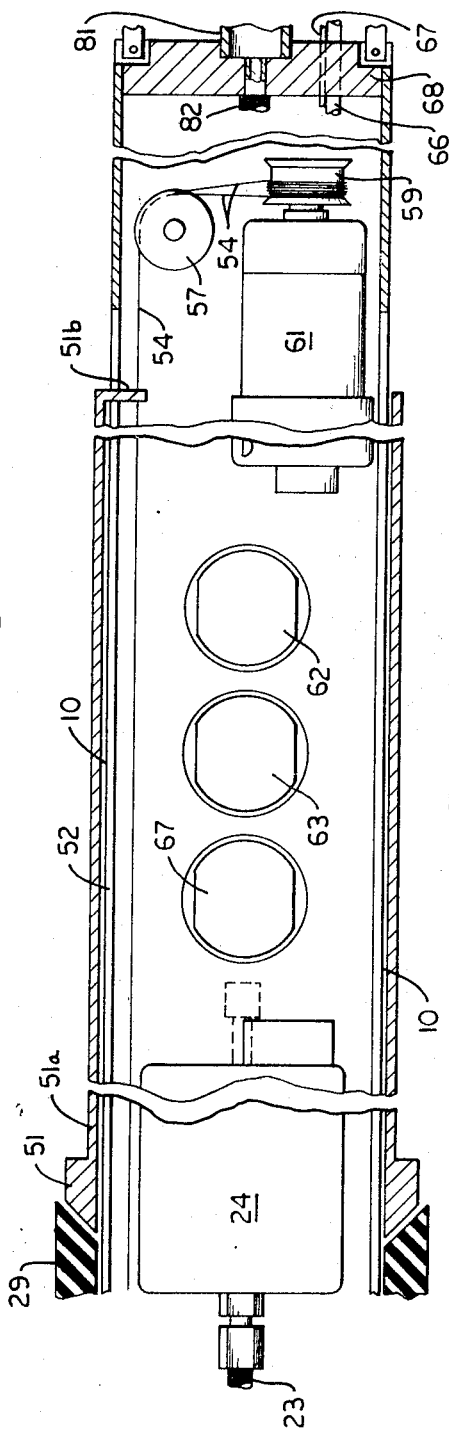

INVENTORS
ROBERT W. COOK
EDMOND J. BISSAILLON
ROBERT P. DICKINSON
BY Woodard, Weikart, Emhardt & Naughton
ATTORNEYS

PATENTED FEB 15 1972 3,642,032

INVENTORS
ROBERT W. COOK
EDMOND J. BISSAILLON
BY ROBERT P. DICKINSON

Woodard, Weikart, Emhardt & Naughton
ATTORNEYS

INTERNAL PIPE CLAMP APPLYING APPARATUS AND METHOD

BACKGROUND OF THE INVENTION

In Cook et al. U.S. Pat. No. 2,894,539, there is disclosed an apparatus and method for sealing leaks in pipes such as gas mains. This apparatus, in general, utilizes a travelling assembly which moves within the gas main to locate and seal leaks utilizing a metered amount of a semiliquid compound deposited at the leak from a storage reservoir carried along as part of the travelling assembly. This apparatus is quite suitable for relatively large diameter gas mains, but use of a semiliquid sealing material, because a supply of it must be carried along in a relatively large reservoir, and because of other inherent characteristics of such arrangements, has not, in the past, been economically adaptable to sealing the interior of smaller diameter gas lines.

SUMMARY OF THE INVENTION

The concept of the present invention involves advancing a magazine or array of expandable leak-sealing rings along the interior of a pipe such as a gasline and automatically expanding and depositing the rings, one by one, at successive leaks, such as at pipe joints, along the length of the pipe. The concentric arrangement of the sealing rings and their expander on a tubular body which also contains, interiorly, the power operators for the expander and for the advancing of the rings, one by one, into position on the expander results in an apparatus of relatively small diameter, particularly well suited for repairing pipe joint leaks or other leaks in relatively small diameter pipes.

BRIEF DESCRIPTION OF THE DRAWINGS

FIG. 2 is a side sectional view of a further portion of the structure shown in FIG. 1.

FIG. 3 is a side sectional view of a further, intermediate portion of the apparatus.

DESCRIPTION OF THE PREFERRED EMBODIMENT

Figure 1:
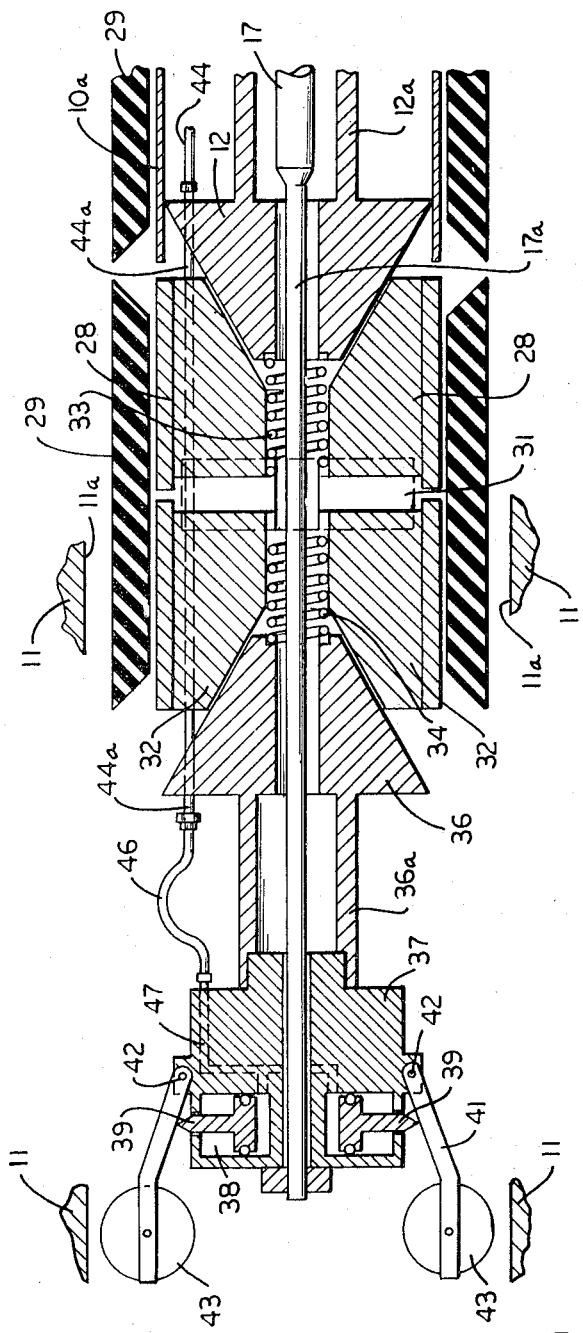
FIG. 1 is a side sectional view of the leading end of an assembly embodying the present invention.

Referring initially to FIGS. 1 2, 3 and 5, the apparatus shown includes a tubular housing 10 of substantial length, the leading portion of the housing (referring to the direction of travel of the assembly through the pipe to be repaired) being shown in FIG. 1. The intermediate portion of the housing and the parts associated therewith is shown in FIG. 2 and a further intermediate portion of the housing is shown in FIG. 3 with the trailing portion of the housing being shown in FIG. 5. The assembly is introduced into a pipe such as a gasline (indicated fragmentarily at 11 in FIG. 1) by opening the pipe at a location, not shown, and inserting the tubular housing into the pipe. Referring specifically to FIG. 1, a tubular extension 10a of the housing 10 accommodates a cone member 12, the cone being secured to a tubular piston rod 13 (FIG. 2) the connection being made by the sleeve 12a extending from the cone.

As may be seen in FIG. 2, the piston rod 13 extends freely through a supporting member 14 and carries a piston 16 which is movable within the bore formed in the tubular housing 10. The piston 16 has a central passage therein through which extends the piston rod 17, carrying the piston 18 also movable within the bore in the housing 10. A compression spring 19 urges the piston leftwardly and bottoms against the end plate 21 which forms the end of the bore within which the pistons 16 and 18 move. An hydraulic fluid passage 22 has a branch passage 22a which extends to and communicates with the chamber between 16 and 18. The passage 22 is adapted to have connected to it an hydraulic fluid tube 23, portions of this hydraulic fluid tube 23 being shown in both FIGS. 2 and 3. The tube 23 serves as a conduit for introduction of hydraulic fluid under pressure to the chamber between the pistons, the hydraulic fluid under pressure being provided by the air-driven hydraulic pump 24 (FIG. 3). The control of the pressurized air supply to the pump 24 will be described subsequently.

Referring again to FIG. 2, the piston 16 is urged rightwardly by a compression spring 26 which extends between the piston and the plate 14. It will be evident that introduction of fluid under pressure into the chamber between the two pistons serves to drive the piston 18 rightwardly and the piston 16 leftwardly and, consequently, correspondingly moves the members 17 and 13 within the housing.

As its leftward end, as viewed in FIG. 1, a reduced stem portion 17a of the shaft 17 extends through a central aperture in the cone 12. The cone 12 extends into a conical opening formed by the arrangement of a series of expander blocks 28 which are positioned beyond the end of the housing extension 10a and are thus free to be displaced radially to expand the clamp ring shown schematically at 29 (the clamp will be subsequently described in detail with reference to FIGS. 7 and 8). A centering plate 31 is interposed between the expander members 28 and an identical series of expander members 32 which also are displaced radially outwardly to expand the clamp 29. Compression spring 33 urges the conical member 12 rightwardly and a similar compression spring 34 urges rightwardly an expander cone 36, identical to the cone 12, this cone entering the aperture formed by the arrangement of the expander members 32. A sleeve 36a extending from the cone 36 carries a member 37 having a series of radial bores 38 formed therein. The bores 38 accommodate piston members 39 which are adapted, when in extended position, to engage the arms 41, pivotally supported at 42, to move them radially outwardly. The extending ends of the arms 41 carry mounted for rotation thereon the wheels 43 and, as will be evident from FIG. 1, the wheels 43 are adapted to engage the inner surface of the gasline 11 when the pistons 39 are in extended positions. An air tube 44 is connected to a tube 44a which extends freely through registering apertures in the cone 12, the expander members 28 and 32 and the cone 36. The tube 44a is connected, at its outer end, to a flexible air conduit 46 which, in turn, is connected to a passage 47 in the member 37, the passage 47 branching to communicate with the portion of the bores 38 radially inward of the piston members 39. From this it will be evident that introduction of air under pressure into the portion of the bores radially inward of the piston members 39 serves to extend the piston members radially and move the wheels 43 into engagement with the adjacent inner surface of the pipe 11.

The shaft 17a extends through the subassembly just described and extends through the members 37 and is held by a nut or similar locking member. From the foregoing it will be evident that as the pistons 16 and 18 are moved apart, the expander cones 36 and 12 will move toward each other thereby expanding radially the outer surface of the members 28 and 32, thereby expanding the clamp 29 against the adjacent pipe surfaces 11a.

As will be evident from FIGS. 1 and 2, a series of clamp rings 29 are coaxially aligned along the length of the tubular housing in stacked relation, the clamping rings being slidable along the exterior surface of the housing so that as the clamping ring overlying the expander assembly is deposited on the pipe surface, the next clamp ring 29 may be moved along the length of the pipe and into position encircling the expander assembly. The means for moving the clamping rings one by one onto the expander takes the form of the encircling abutment 51 (FIGS. 2 and 3). The abutment 51 has an extending sleeve portion 51a which surrounds the tubular housing 10 and, at one end, as may be seen in FIG. 3, is provided with an inturned portion 51b which extends through an elongated slot 52 which extends substantially the entire length of the tubular housing 10.

Figure 4:
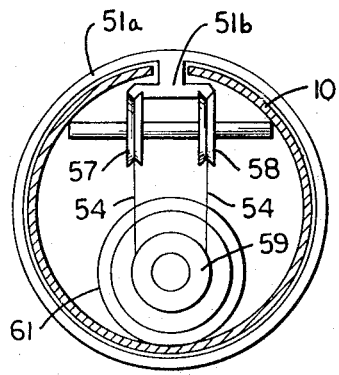
FIG. 4 is a cross-sectional view taken generally along the line 4—4 of FIG. 3.

As may best be seen in FIGS. 3 and 4, the inturned member 51b is secured to a flexible wire or cord 54, the cord 54 extending around an idler pulley 56 (FIG. 2) and returns with both segments of the cord 54 passing over the idler pulleys 57 and 58, both pulleys being shown in FIG. 4 but only pulley 57 appearing in FIG. 3. The drive for moving the cord 54, and thus for moving the abutment 51 along the axis of the tubular housing 10, includes the sheave 59, around which the cord 54 is wrapped, which is driven by the reversibly pneumatic motor 61. The motivating air supply to the forward and reverse inputs to the motor 61 are controlled by the solenoid valves 62 and 63, respectively, the disposition of these valves with respect to the external air supply being illustrated in FIG. 9.

Figure 9:
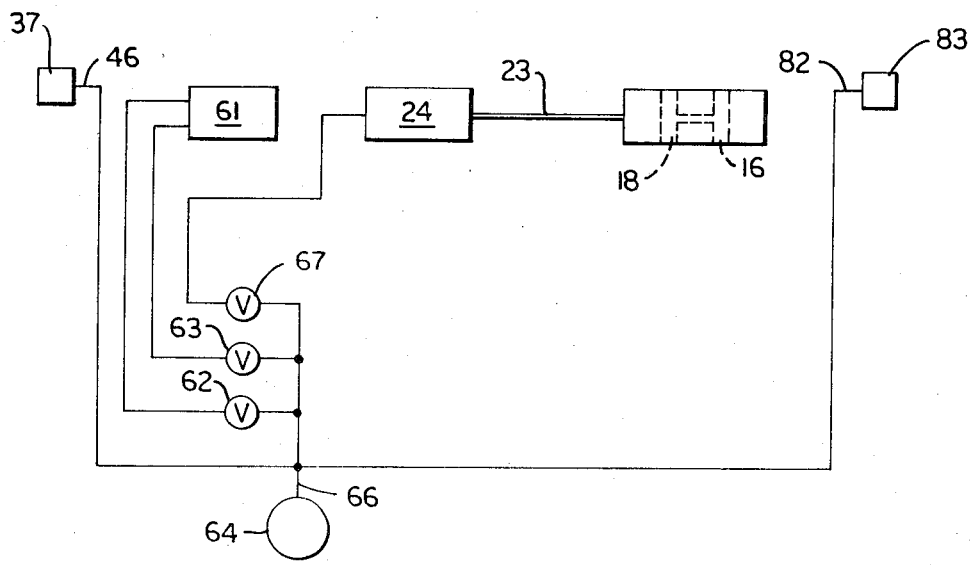
FIG. 9 is a schematic diagram of the pneumatic circuit for the apparatus.
Figure 10:
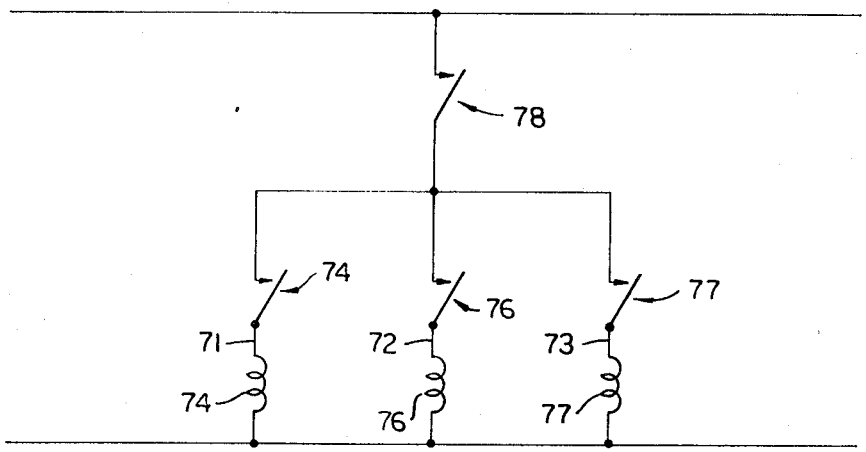
FIG. 10 is a schematic wiring diagram for the electrical components of the apparatus.

The flexible pneumatic line 66 and the electrical lines 67 enter the tubular housing through a suitable aperture in the end plate 68 (FIG. 3), the pneumatic supply line 66 extending externally to the source of pressurized air shown schematically at 64 in FIG. 9, the air supply pressure being at, for example, 100 p.s.i. The solenoid valve 67 controls the supply of actuating air pressure to the air-operated hydraulic pump 24 as shown in FIG. 9. The electrical input line 67 (FIG. 3) to these solenoid valves is identified as 71, 72 and 73 in FIG. 10, the schematic circuit of FIG. 10 showing the solenoid operators for the valves 62, 63 and 67 as being identified as 74, 76 and 77. A primary on-off switch is indicated schematically at 78 and each of the solenoid operators are controlled by a separate switch, indicated at 74a, 76a and 77a, respectively. It will be understood that the switches 78, 74a, 76a and 77a are located exteriorly of the assembly described and can be actuated manually or automatically by any suitable means.

Figure 5:
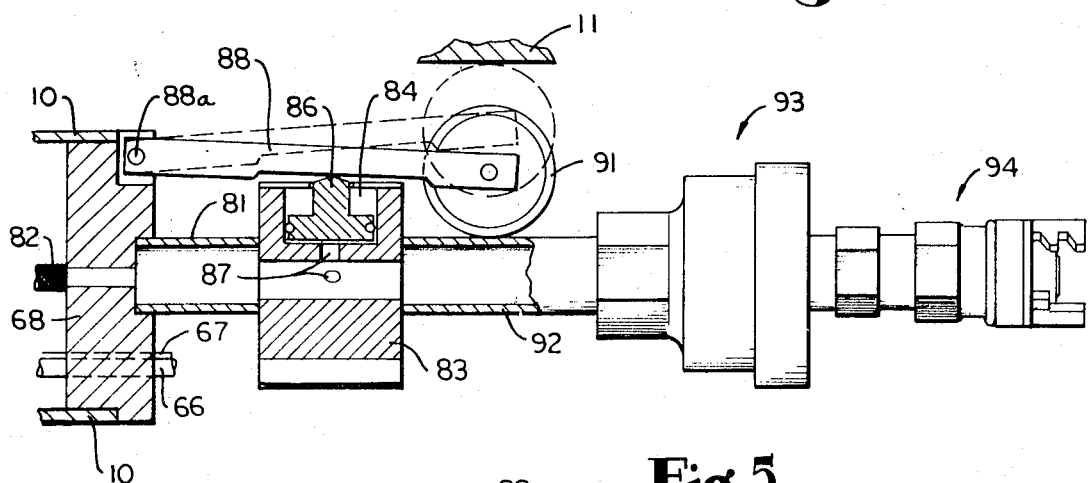
FIG. 5 is a side sectional view of the trailing end of the apparatus shown in FIGS. 1–3.
Figure 6:
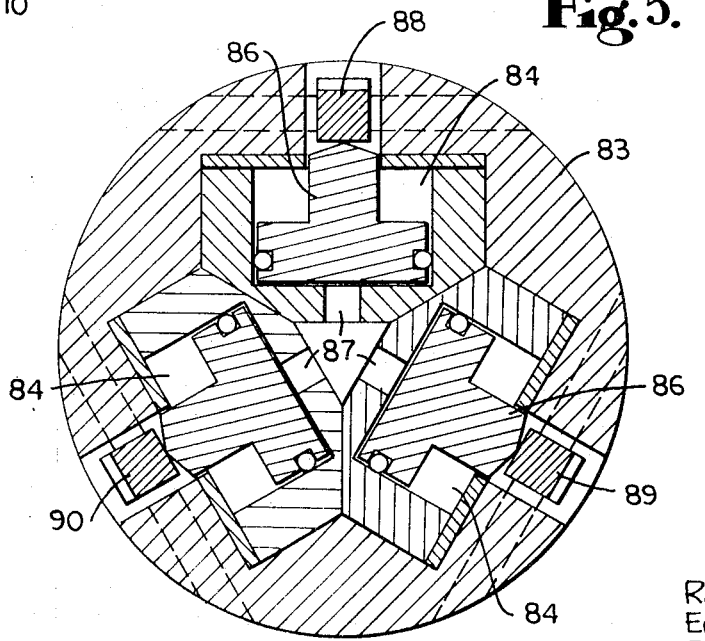
FIG. 6 is a transverse cross-sectional view taken generally along the line 6—6 of FIG. 5.

Referring to FIGS. 5 and 6, the final, trailing portion of the assembly will be described. Secured to the end plate 68 and a tube 81 which communicates with the flexible pneumatic tubing 82, the tubing 82 communicating with the air pressure supply lines 66. The tube or pipe 81 carries an element 83 which, as may best be seen in FIG. 6, is provided with a plurality of bores 84 which extend radially within the element 83. Movable within each of the bores is a piston 86 and the space within the bores beneath the pistons communicates by means of passages 87 with the pressurized air introduced into the pipe 81 through the tube 82.

The extending ends of the pistons 86 engage members 88, 89 and 90 (FIG. 3) which are pivotally attached to the end plate 68, the attachment of member 88 being illustrated in FIG. 5, its pivotal axis being indicated at 88a, and it will be understood that the elements 89 and 90 are identically attached. At their free ends the elements 88, 89 and 90 carry pipe-engaging rollers or wheels 91 (FIG. 5). As will be evident from FIG. 5 when the space beneath the pistons is pressurized, the elements 88, 89 and 90 will be pivotally moved outwardly until their respective wheels 91 engage the inner surface of the surrounding pipe 11, the pipe-engaging position of one of the wheels 91 being illustrated in broken lines in FIG. 5. A member 92 extends from the element 83 and has attached to it through a conventional ball-joint attachment, indicated generally at 93, a quick-connect coupling indicated generally at 94. The joint 93 and the coupling 94 are of conventional construction and the coupling 94 is adapted to receive the end of a flexible cable or other element which is used to push the assembly through the enclosing pipeline 11, this serving as a means for propelling the assembly through the pipeline.

Figure 7:
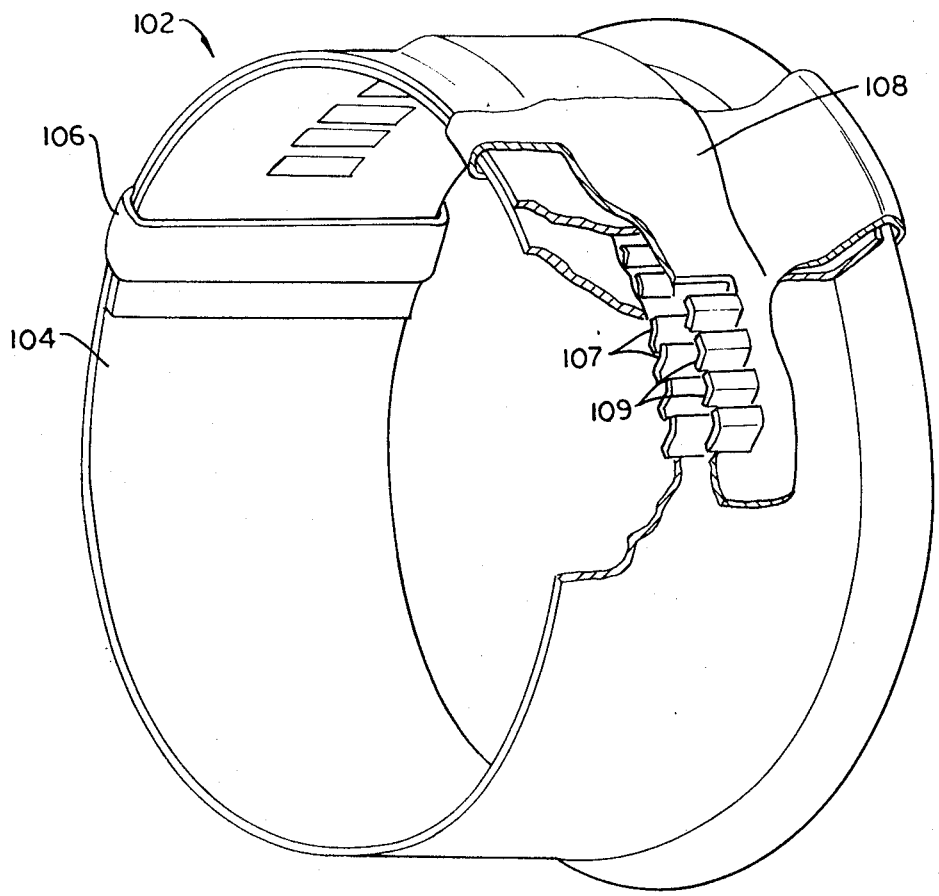
FIG. 7 is a perspective view of a portion of an expandable sealing ring utilized by the apparatus of the present invention.

The specific structure of the expandable clamp member 29 will now be described with reference to FIGS. 7 and 8. Each of the expansion members includes two, end-to-end metal sleeves 101 and 102 (FIG. 8), one of the sleeves, identified at 102, being illustrated in detail in FIG. 7. The sleeves are formed of an overlapping metal strip 104 held by a clamp 106. A portion of the outermost surface of the strip 104 has struck upwardly from it the ratchet tabs 107. Overlying this portion of the strip is a member 108 from which ratchet locking members 109 are struck. When a radially expanding force is applied to the inner surface of the strip 104, the overlapping portions of the strip 104 will be moved relative to each other slipping the ratchet members 107 with respect to the lock members 109, however, the locking members will hold the strip or band 104 in expanded position.

Figure 8:
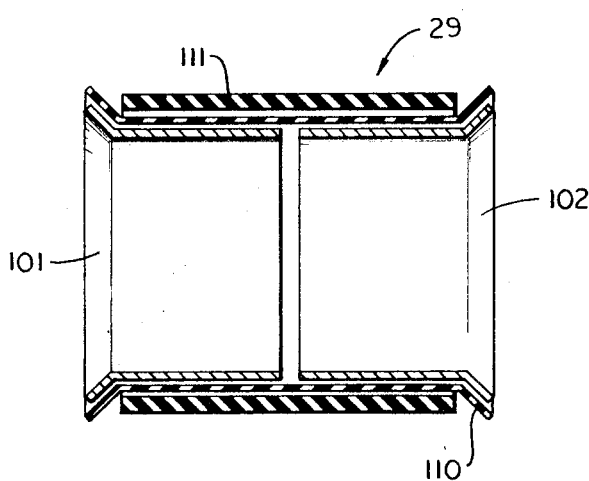
FIG. 8 is a cross-sectional view of a complete sealing ring utilized by the apparatus of the present invention.

As may best be seen in FIG. 8, overlying the two end-to-end arranged members 101 and 102 is a unitary rubber sleeve 110 and encircling the sleeve 110 is a further, somewhat thicker, sleeve 111 formed of a suitable semiplastic sealing material. Each of the clamping members 29, shown schematically in FIG. 2, may be specifically constructed as illustrated in FIGS. 7 and 8.

In operation, the conduit such as a gas pipeline may be repaired by opening the conduit and introducing into its interior the mobile assembly described above. Utilizing the control components shown in FIG. 10 and the pneumatic components shown in FIG. 9, the guide wheel assemblies at each end of the assembly may be actuated to center the assembly in the conduit and the assembly may then be moved along the axis of the conduit until, by using leak or fault detection apparatus, not shown, the clamp member overlying the annular expansion member is adjacent the leak or fault. The double-acting hydraulic actuator pistons 16 and 18 may then be actuated to expand the clamp into sealing engagement with the leak or fault. The assembly may then be advanced to the next fault in the conduit and during such advancement, the abutment 51 may be advanced by actuating, in the forward direction, the reversible air motor 61 which drives the cable or line 54 to move the abutment 51. The abutment is moved until the next clamp member 29 is advanced over the expansion assembly for application to the next fault or leak in the conduit.

The operation is thus repeated until all of the stacked clamping members have been applied to successive leaks in the conduit. The assembly may then be withdrawn and reloaded and reinserted in the conduit to be repaired.

We claim:

1. A method of repairing a leak in a tubular conduit, such as a gas pipeline, comprising: opening the conduit and introducing into its interior a mobile assembly carrying a plurality of separate expandable leak-sealing elements, moving the mobile assembly along the conduit to the site of a leak, remotely expanding one of said leak-sealing elements against the conduit wall adjacent the leak, and then, in turn advancing the mobile assembly to each leak further along the length of the conduit and sequentially applying to each leak one of said sealing elements.

2. A method of repairing a series of spaced leaks in tubular conduits when only the interior of the conduit is accessible over a substantial portion of its length comprising: opening the conduit and introducing into its interior a mobile assembly carrying a plurality of expandable rings aligned in stacked relation on a central axis paralleling the central axis of the conduit, moving the mobile assembly along the conduit to the site of a leak with the expandable ring at one end of the stacked rings aligned with the leak, expanding said end ring into leak-sealing engagement with the conduit wall, then in turn advancing said mobile assembly to each consecutive leak and expanding the endmost ring into sealing engagement with the conduit wall adjacent the leak until all of the rings carried by the assembly have been utilized.

3. An apparatus for repairing leaks in a tubular conduit comprising a tubular housing adapted to fit freely within the conduit, a guide wheel assembly mounted at each end of said housing and adapted to engage the curved sidewalls of the conduit and center the housing therein, a plurality of expandable annular clamps encircling said tubular housing and supported thereon in stacked coaxial relation and slidable along the exterior surface of the housing, an expansion assembly comprising an annular member carried by said housing in coaxial relation with the housing and expandable from a diameter substantially the same as that of the tubular housing to a substantially larger diameter, an abutment supported for limited movement parallel to the housing axis and engageable with said stacked clamps, and power means within said housing for selectively moving said abutment to position the endmost of said stacked clamps in overlying relation with said annular expansion member, and then expanding said expansion member to thereby expand said overlying annular clamp into engagement with the tubular conduit sidewalls, said abutment being successively moved by said power means to advance said clamps one by one into overlying relation with said expansion member as said assembly is moved along the length of said conduit and said clamps are expanded into leak-sealing relation with successive defective portions of the conduit wall.

4. An apparatus as claimed in claim 3 in which said guide wheel assemblies each include a plurality of guide wheels mounted for extension radially from the longitudinal axis of the housing into engagement with the conduit walls to center the housing within the conduit, and air-operated means for extending said guide wheels.

* * * * *